(12) United States Patent
Juels et al.

(10) Patent No.: US 9,009,385 B1
(45) Date of Patent: Apr. 14, 2015

(54) CO-RESIDENCY DETECTION IN A CLOUD-BASED SYSTEM

(75) Inventors: Ari Juels, Brookline, MA (US); Alina M. Oprea, Arlington, MA (US); Michael Kendrick Reiter, Chapel Hill, NC (US); Yinqian Zhang, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 662 days.

(21) Appl. No.: 13/174,177

(22) Filed: Jun. 30, 2011

(51) Int. Cl.
*G06F 12/14* (2006.01)
*G06F 3/06* (2006.01)
*G06F 13/16* (2006.01)

(52) U.S. Cl.
CPC .......... *G06F 3/0622* (2013.01); *G06F 13/1663* (2013.01); *G06F 12/14* (2013.01)

(58) Field of Classification Search
None
See application file for complete search history.

(56) References Cited

U.S. PATENT DOCUMENTS

| | | | |
|---|---|---|---|
| 6,016,529 A * | 1/2000 | Woodman | 711/3 |
| 8,132,073 B1 | 3/2012 | Bowers et al. | |
| 8,386,610 B2 * | 2/2013 | Yahalom et al. | 709/226 |
| 8,392,657 B2 * | 3/2013 | Zhao et al. | 711/121 |
| 2009/0276774 A1 * | 11/2009 | Kinoshita | 718/1 |
| 2010/0235599 A1 * | 9/2010 | Akagawa et al. | 711/163 |

OTHER PUBLICATIONS

O. Aciiçmez et al., "Trace-Driven Cache Attacks on AES (Short Paper)," 8th International Conference on Information and Communications Security (ICICS), Dec. 2006, pp. 112-121, Raleigh, North Carolina.

O. Aciiçmez et al., "On the Power of Simple Branch Prediction Analysis," 2nd ACM Symposium on Information, Computer and Communications Security (ASIACCS), Mar. 2007, pp. 312-320, Singapore.

O. Aciiçmez et al., "Predicting Secret Keys Via Branch Prediction," Topics in Cryptology—CT-RSA, The Cryptographer's Track at the RSA Conference, Feb. 2007, pp. 225-242, vol. 4377, San Francisco, California.

O. Aciiçmez et al., "Cache Based Remote Timing Attack on the AES," Topics in Cryptology—CT-RSA, The Cryptographer's Track at the RSA Conference, Feb. 2007, pp. 271-286, 86, vol. 4377, Francisco, California.

A. Aviram et al., "Determinating Timing Channels in Compute Clouds," ACM Cloud Computing Security Workshop (CCSW), Oct. 2010, pp. 103-108, Chicago, Illinois.

(Continued)

*Primary Examiner* — Christian P Chace
*Assistant Examiner* — Eric Loonan
(74) *Attorney, Agent, or Firm* — Ryan, Mason & Lewis, LLP

(57) ABSTRACT

At least one virtual machine implemented on a given physical machine in an information processing system is able to detect the presence of one or more other virtual machines that are also co-resident on that same physical machine. More particularly, at least one virtual machine is configured to avoid usage of a selected portion of a memory resource of the physical machine for a period of time, and to monitor the selected portion of the memory resource for activity during the period of time. Detection of a sufficient level of such activity indicates that the physical machine is also being shared by at least one other virtual machine. The memory resource of the physical machine may comprise, for example, a cache memory, and the selected portion of the memory resource may comprise one or more randomly selected sets of the cache memory.

24 Claims, 4 Drawing Sheets

(56) References Cited

OTHER PUBLICATIONS

C. Bienia et al., "The PARSEC Benchmark Suite: Characterization and Architectural Implications," 17th International Conference on Parallel Architectures and Compilation Techniques (PACT), Oct. 2008, pp. 72-81, Toronto, Ontario, Canada.
C. Bienia et al., "PARSEC 2.0: A New Benchmark Suite for Chip-Multiprocessors," 5th Annual Workshop on Modeling, Benchmarking and Simulation, Jun. 2009, 9 pages.
A. Bogdanov et al., "Differential Cache-Collision Timing Attacks on AES with Applications to Embedded CPUs," Topics in Cryptology—CT-RSA, The Cryptographer's Track at the RSA Conference, Mar. 2010, pp. 235-251, San Francisco, California.
J. Bonneau et al., "Cache-Collision Timing Attacks Against AES," 8th International Workshop on Cryptographic Hardware and Embedded Systems (CHES), Oct. 2006, pp. 201-215, Yokohama, Japan.
B.B. Brumley et al., "Cache-Timing Template Attacks," Advances in Cryptology—ASIACRYPT, 15th International Conference on the Theory and Application of Cryptology and Information Security, Dec. 2009, pp. 667-684, vol. 5912, Tokyo, Japan.
E. Bugnion et al., "Compiler-Directed Page Coloring for Multiprocessors," 7th International Conference on Architectural Support for Programming Languages and Operating Systems (ASPLOS-VII), Oct. 1996, pp. 244-255, vol. 30, No. 5, Cambridge, Massachusetts.
Y. Dong et al., "Extending Xen with Intel Virtualization Technology," Intel Technology Journal, Aug. 2006, pp. 193-204, vol. 10, No. 3.
P. Grabher et al., "Cryptographic Side-Channels from Low-Power Cache Memory," 11th IMA International Conference on Cryptography and Coding, Dec. 2007, pp. 170-184, vol. 4887, Cirencester, United Kingdom.
E. Käsper et al., "Faster and Timing-Attack Resistant AES-GCM," 11th International Workshop on Cryptographic Hardware and Embedded Systems (CHES), Sep. 2009, pp. 1-17, Lausanne, Switzerland.
Paul C. Kocher, "Timing Attacks on Implementations of Diffie-Hellman, RSA, DSS, and Other Systems," 16th Annual International Cryptology Conference on Advances in Cryptology—CRYPTO, Aug. 1996, pp. 104-113, vol. 1109, Santa Barbara, California.
J. Kong et al., "Deconstructing New Cache Designs for Thwarting Software Cache-Based Side Channel Attacks," 2nd ACM Workshop on Computer Security Architectures (CSAW), Oct. 2008, pp. 25-34, Alexandria, Virginia.
G. Leander et al., "Cache Timing Analysis of LFSR-Based Stream Ciphers," 12th IMA International Conference on Cryptography and Coding, Dec. 2009, pp. 433-445, Cirencester, United Kingdom.
S. Manegold et al., "The Calibrator (v0.9e), a Cache-Memory and TLB Calibration Tool," http://homepages.cwi.nl/~manegold/Calibrator, Oct. 2010, 4 pages.
G. Neiger et al., "Intel Virtualization Technology: Hardware Support for Efficient Processor Virtualization," Intel Technology Journal, Aug. 2006, 14 pages, vol. 10, No. 3.
M. Neve et al., "Advances on Access-Driven Cache Attacks on AES," 13th International Workshop on Selected areas in Cryptography (SAC), Aug. 2006, pp. 147-162, vol. 4356, Montreal, Canada.
M. Neve et al., "A Refined Look at Bernstein's AES Side-Channel Analysis," ACM Symposium on Information, Computer and Communications Security (ASIACCS), Mar. 2006, p. 369, Taipei, Taiwan.
PCI Security Standards Council, "Payment Card Industry (PCI) Data Security Standard v.2," URL: https://www.pcisecuritystandards.org/security_standards, Oct. 2010, 75 pages.
H. Raj et al., "Resource Management for Isolation Enhanced Cloud Services," ACM Workshop on Cloud Computing Security (CCSW), Nov. 2009, pp. 77-84, Chicago, Illinois.
T. Ristenpart et al., "Hey, You, Get Off of My Cloud: Exploring Information Leakage in Third-Party Compute Clouds," 16th ACM Conference on Computer and Communications Security (CCS), Nov. 2009, pp. 199-212, Chicago, Illinois.
B. Stone et al., "Companies Slowly Join Cloud-Computing," The New York Times, Apr. 2010, 3 pages.
K. Tiri et al., "An Analytical Model for Time-Driven Cache Attacks," 14th International Workshop on Fast Software Encryption (FSE), Mar. 2007, pp. 399-413, vol. 4593, Luxembourg, Luxembourg.
E. Tromer et al., "Efficient Cache Attacks on AES, and Countermeasures," Journal of Cryptology, Jan. 2010, pp. 37-71, vol. 23, No. 2.
Y. Tsunoo et al., "Cryptanalysis of DES Implemented on Computers with Cache," 5th International Workshop on Cryptographic Hardware and Embedded Systems (CHES), Sep. 2003, pp. 62-76, vol. 2779, Cologne, Germany.
Jaikumar Vijayan, "Will Security Concerns Darken Google's Government Cloud?" Computerworld, Sep. 2009, 2 pages.
Z. Wang et al., "Covert and Side Channels Due to Processor Architecture," 22nd Annual Computer Security Applications Conference (ACSAC), Dec. 2006, pp. 473-482, Miami Beach, Florida.
Z. Wang et al., "New Cache Designs for Thwarting Software Cache-Based Side Channel Attacks," 34th International Symposium on Computer Architecture (ISCA), Jun. 2007, pp. 494-505, San Diego, California.
Z. Wang et al., "A Novel Cache Architecture with Enhanced Performance and Security," 41st Annual IEEE/ACM International Symposium on Microarchitecture (MICRO-41), Nov. 2008, pp. 88-93, Lake Como, Italy.
Erik Zenner, "A Cache Timing Analysis of HC-256," 15th International Workshop on Selected Areas in Cryptography (SAC), Aug. 2009, Sackville, New Brunswick, Canada.
U.S. Appl. No. 12/827,097, filed in the name of A. Juels et al. on Jun. 30, 2010 and entitled "Distributed Storage System with Efficient Handling of File Updates."
O. Aciiçmez et al., "New Results on Instruction Cache Attacks," 12th International Workshop on Cryptographic Hardware and Embedded Systems (CHES), Aug. 2010, pp. 110-124, Santa Barbara, California.
O. Aciiçmez et al., "Cheap Hardware Parallelism Implies Cheap Security," 4th International Workshop on Fault Diagnosis and Tolerance in Cryptography (FDTC), Sep. 2007, pp. 80-91, Vienna, Austria.
M. Fernandez et al., "Closed-Form Expression for the Poisson-Binomial Probability Density Function," IEEE Transactions on Aerospace and Electronic Systems, Apr. 2010, pp. 803-817, vol. 46, No. 2.
M. Henricksen et al., "Side-Channel Analysis of the K2 Stream Cipher," 15th Australasian Conference on Information Security and Privacy (ACISP), Jul. 2010, pp. 53-73.
G. Keramidas et al., "Non Deterministic Caches: A Simple and Effective Defense Against Side Channel Attacks," Design Automation for Embedded Systems, Sep. 2008, pp. 221-230, vol. 12, No. 3.
Robert Könighofer, "A Fast and Cache-Timing Resistant Implementation of the AES," Topics in Cryptology—CT-RSA, The Cryptographer's Track at the RSA Conference, Apr. 2008, pp. 187-202, vol. 4964, San Francisco, California.
W.L. Lynch et al., "The Effect of Page Allocation on Caches," 25th Annual International Symposium on Microarchitecture (MICRO), Nov. 1992, pp. 222-225, Portland, Oregon.
C. Rebeiro et al., "Cache Timing Attacks on Clefia," Progress in Cryptology—INDOCRYPT, 10th International Conference on Cryptology in India, Dec. 2009, pp. 104-118, vol. 5922, New Delhi, India.
Y. Tsunoo et al., "Improving Cache Attacks by Considering Cipher Structure," International Journal of Information Security, Jul. 2006, pp. 166-176, vol. 5, No. 3.
Amazon Web Services (AWS), "Amazon Elastic Computer Cloud (Amazon EC2)," http://aws.amazon.com/ec2/, 5 pages. (Oct. 2006).
"FlexiScale Utility Computing," http://www.flexiant.com/, 2 pages. (Jan. 2010).
"The Rackspace Cloud," http://www.rackspacecloud.com/, 3 pages. (Jun. 2009).
Amazon Web Services (AWS), "AWS Case Study: Numerate Finds a Winning Combination with AWS," http://bit.ly/aOONsQ, 2010, 2 pages. (Nov. 2010).
Colin Percival, "Cache Missing for Fun and Profit," BSDCan, 2005, 13 pages, Ottawa, Canada. (May 2005).
Y. Tsunoo et al., "Cryptanalysis of DES Implemented on Computers with Cache," CHES, LNCS 2779, 2003, pp. 62-76. (Sep. 2003).

* cited by examiner

CO-RESIDENCY DETECTION IN A CLOUD-BASED SYSTEM

STATEMENT REGARDING FEDERALLY SPONSORED RESEARCH

This invention was made with Government support under Grant No. CNS-0910483 awarded by the National Science Foundation. The Government has certain rights in the invention.

FIELD OF THE INVENTION

The present invention relates generally to the field of information processing, and more particularly to cloud-based information processing systems that comprise multiple virtual machines sharing a common physical machine.

BACKGROUND OF THE INVENTION

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used by cloud service providers to build a variety of different types of virtual infrastructure, including private and public cloud computing and storage systems, which may be distributed across hundreds of interconnected computers, storage devices and other physical machines.

In cloud-based system arrangements of the type described above, enterprises in effect become tenants of the cloud service providers. However, by relinquishing control over their information technology resources, cloud tenants expose themselves to additional potential security threats. For example, a given tenant may be inadvertently sharing physical hardware resources with other tenants that could be competitors or attackers. The virtual machines of the given tenant may therefore be running on the same physical machine or set of physical machines as the virtual machine of a competitor or attacker. This is problematic in that hostile virtual machines can use side-channel attacks to potentially extract sensitive data, such as passwords and cryptographic keys, from other virtual machines resident on the same physical machine or set of physical machines.

For such reasons, enterprises often demand physical isolation for their cloud deployments. While cloud service providers may promise physical isolation, and even commit to it in service-level agreements (SLAs), enforcement by tenants and their auditors is a challenge. Cloud systems make heavy use of virtualization to abstract away underlying hardware for simplicity and flexibility. Such systems are architected to be hardware opaque, not hardware transparent, and are thus configured in a manner that is at odds with verification of physical isolation. Accordingly, it remains difficult for a tenant to obtain verifiable assurances that its virtual machines are the only virtual machines running on a given physical machine or set of physical machines of a cloud service provider.

SUMMARY OF THE INVENTION

An illustrative embodiment of the invention provides techniques for allowing one or more virtual machines running on a given physical machine to determine if one or more other virtual machines are co-resident on that same physical machine. Such an arrangement can advantageously provide a given tenant of a cloud service provider with assurances that its virtual machines are the only virtual machines running on a given physical machine or set of physical machines.

In one aspect, at least one virtual machine implemented on a given physical machine in an information processing system is able to detect the presence of one or more other virtual machines that are also co-resident on that same physical machine. More particularly, at least one virtual machine is configured to avoid usage of a selected portion of a memory resource of the physical machine for a period of time, and to monitor the selected portion of the memory resource for activity during the period of time. Detection of a sufficient level of such activity indicates that the physical machine is also being shared by at least one other virtual machine. The memory resource of the physical machine may comprise, for example, a cache memory, and the selected portion of the memory resource may comprise one or more randomly selected sets of the cache memory.

By way of example, multiple virtual machines implemented on the physical machine may coordinate avoidance of the selected portion of the memory resource of the physical machine for the period of time. This may involve randomly selecting a plurality of sets of a cache memory of the physical machine for a given detection period and coordinating avoidance of those selected sets for the detection period.

The illustrative embodiments described herein advantageously overcome the difficulties associated with tenant verification of cloud service provider claims that the virtual machines of the tenant have exclusive access to the physical machine or set of physical machines on which those virtual machines are implemented. This provides significantly enhanced security for cloud service provider tenants, in effect allowing them to detect and address vulnerabilities to side-channel attacks to which they might otherwise be exposed by sharing a physical machine with another unrelated tenant.

These and other features and advantages of the present invention will become more readily apparent from the accompanying drawings and the following detailed description.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
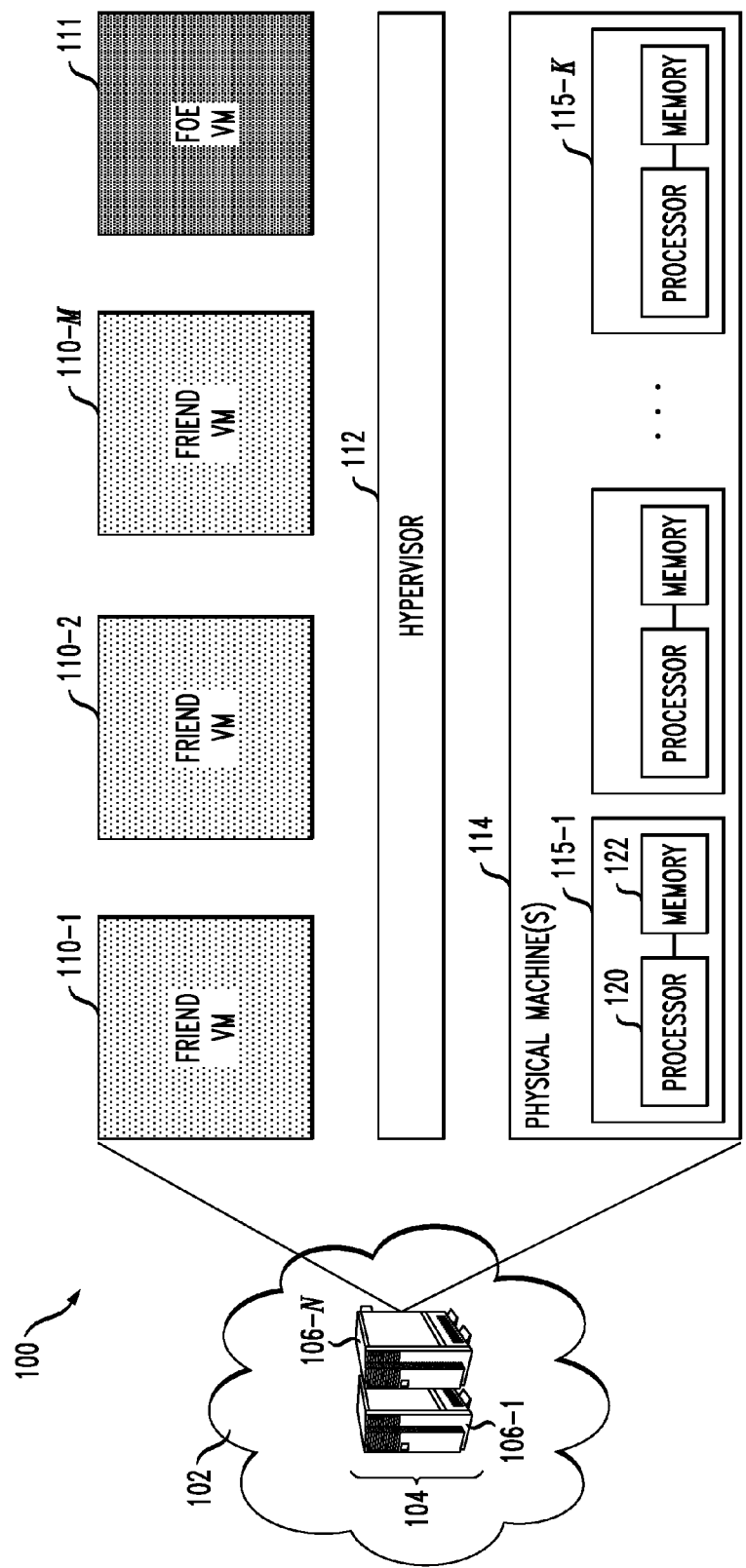
FIG. 1 is a block diagram of a cloud-based information processing system in an illustrative embodiment of the invention.

FIG. 1 shows an information processing system 100 configured with co-residency detection functionality in accordance with an illustrative embodiment of the invention. The system 100 in this embodiment comprises information technology (IT) infrastructure 102 of a cloud service provider. The term "cloud service provider" as used herein is intended to be broadly construed, so as to encompass private cloud as well as public cloud arrangements. The service provider IT infrastructure 102 may be used to provide one or more delivered services for a business or other enterprise, such as Infrastructure as a Service (IAAS). In receiving such services, the enterprise utilizes a portion of the service provider IT infrastructure 102 as a tenant. The tenant may be configured to communicate with the service provider IT infrastructure via a service interface established over a network such as the Internet. Those skilled in the art will recognize that communication over a service interface may be secured using well understood techniques such as Transport Layer Security (TLS) or Secure Sockets Layer (SSL) or other techniques to ensure confidentiality and integrity.

The service provider IT infrastructure 102 as shown comprises a processing platform 104 that includes an arbitrary number N of processing devices 106-1 through 106-N, which may be interconnected by one or more networks that are not shown in the figure. The processing platform 104 is used to provide a plurality of virtual machines (VMs) including "friend" virtual machines 110-1, 110-2, . . . 110-M and potentially at least one "foe" virtual machine 111. The virtual machines 110 and 111 are implemented under the control of a hypervisor 112 using one or more physical machines 114 of the processing platform 104. A given such physical machine or set of physical machines may comprise multiple processing devices 115-1 through 115-K, each comprising a processor 120 coupled to a memory 122. The processing devices 115 may correspond to particular ones of the processing devices 106, or may represent portions or combinations of such processing devices.

It is assumed that the friend virtual machines 110 are associated with a particular tenant of the cloud service provider, and that the potential foe virtual machine 111 is associated with a different tenant of the cloud service provider, such as a potential competitor or attacker of the particular tenant. It should be noted that there may be no foe virtual machine running on the same physical machine or set of physical machines as the friend virtual machines, in which case the co-residency detection functionality will verify this condition, and thereby confirm that the desired tenant virtual machine isolation policies are being implemented correctly by the cloud service provider.

In the illustrative embodiments to be described in conjunction with FIGS. 1 through 4, multiple friend virtual machines 110 collaborate to detect the presence of at least one foe machine 111. However, alternative arrangements are possible. For example, a single one of the friend virtual machines 110 can be configured to detect the presence of one or more foe virtual machines 111. In such an arrangement, a co-residency detection process may be run by a single friend virtual machine that avoids a selected portion of a cache memory of a physical machine, with the single virtual machine serving as both an initiator virtual machine and a detection virtual machine.

Although only a single hypervisor is shown in the embodiment of FIG. 1, the system 100 may of course include multiple hypervisors each providing a set of virtual machines using at least one underlying physical machine.

An example of a commercially available hypervisor platform that may be used to implement portions of the service provider IT infrastructure 102 in one or more embodiments of the invention is the VMware® vSphere™ which may have an associated virtual infrastructure management system such as the VMware® vCenter™. The underlying physical machines may comprise one or more distributed processing platforms that include hardware products such as Celerra® or CLARiiON®, both commercially available from EMC Corporation of Hopkinton, Mass. A variety of other storage products, such as VNX and Symmetrix VMAX, both also from EMC Corporation, may be utilized to implement at least a portion of the service provider IT infrastructure 102.

One or more of the elements within service provider IT infrastructure 102 of system 100 may therefore comprise a server, computer or other processing platform element, which may be viewed as an example of what is more generally referred to herein as a "processing device." As illustrated in FIG. 1, such a device 115 generally comprises at least one processor and an associated memory, and implements one or more functional modules for controlling certain features of the information processing system 100.

The processor 120 may comprise a microprocessor, a microcontroller, an application-specific integrated circuit (ASIC), a field programmable gate array (FPGA) or other type of processing circuitry, as well as portions or combinations of such circuitry elements. The memory 122 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device causes the device to perform one or more functions associated with co-residency detection within the system 100. One skilled in the art would be readily able to implement such software given the teachings provided herein. Other examples of computer program products embodying aspects of the invention may include, for example, optical or magnetic disks.

Again, the particular processing platform 104 shown in the figure is presented by way of example only, and system 100 may include additional or alternative processing platforms, as well as numerous distinct processing platforms in any combination, with each such platform comprising one or more servers, computers or other processing devices. By way of example, embodiments of the invention may be implemented in a distributed storage system of the type described in U.S. patent application Ser. No. 12/495,189, filed Jun. 30, 2009 and entitled "Distributed Storage System with Enhanced Security," or U.S. patent application Ser. No. 12/827,097, filed Jun. 30, 2010 and entitled "Distributed Storage System with Efficient Handling of File Updates," which are commonly assigned herewith and the disclosures of which are hereby incorporated by reference herein.

It is therefore to be appreciated that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

The co-residency detection functionality of the information processing system 100 will now be described in greater detail with reference to FIGS. 2 through 4.

As indicated previously, conventional arrangements are problematic in that a tenant of a cloud service provider is generally not able to verify reliably that it has exclusive use of the physical machine or set of physical machines on which its virtual machines are running. Embodiments of the invention overcome this problem by providing techniques for co-residency detection that can be performed by one or more virtual machines of a given tenant without any need for modification of the hypervisor.

For example, in the present embodiment, at least a subset of the friend virtual machines 110 sharing the physical machine 114 avoid usage of a selected portion of a memory resource of a physical machine or set of physical machines for a period of time, and monitor the selected portion of the memory resource for activity during that period of time, with detection of sufficient levels of such activity indicating that the physical machine is also being shared by at least one other virtual machine, such as the unrelated foe virtual machine 111.

Figure 2:
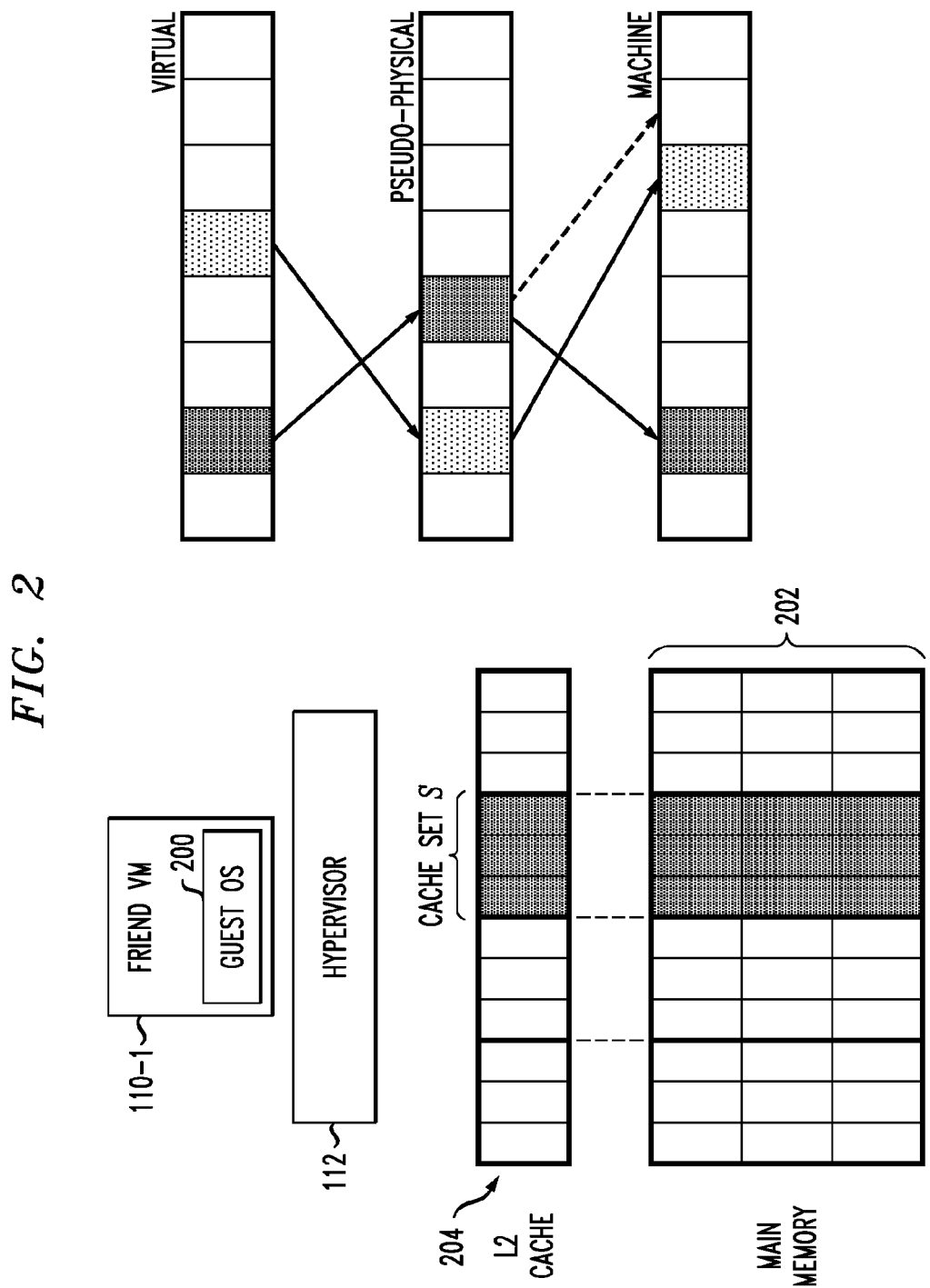
FIG. 2 illustrates an address remapping process implemented in the FIG. 1 system.

Referring now to FIG. 2, it is assumed that each of the virtual machines 110 and 111 operating under control of the hypervisor 112 comprises a guest operating system (OS) 200. This guest operating system 200 is part of the corresponding virtual machine, as illustrated for virtual machine 110-1 in the figure. It is further assumed that the physical machine 114 shared by the virtual machines 110 and 111 comprises a main memory 202 and a corresponding cache memory 204, which may collectively correspond to one or more of the memories 122 shown in FIG. 1. The friend virtual machines 110 coordinate avoidance of a selected portion of the cache memory 204, in this case at least one randomly-selected cache set S, for a period of time that allows them to detect activity in the cache 204 by the foe virtual machine 111. The cache 204 is illustratively a Level 2 (L2) cache, although other types of caches, or more generally memory resources, may be used in alternative embodiments.

Cache sizes usually range from several kilobytes to several megabytes. They are generally organized as a sequence of blocks referred to as cache lines, with fixed size, for example, between 8 and 512 bytes. Typical caches are set-associative. A w-way set-associative cache is partitioned into m sets, each with w lines. Each block in the main memory can be placed into only one cache set to which it maps, but can be placed in any of the w lines in that set. The spectrum of set-associative caches includes two extremes: direct-mapped caches in which a memory block has a unique location in the cache (corresponding to w=1), and fully associative caches in which a memory block can be mapped to any location in the cache (corresponding to m=1). Increasing the degree of associativity usually decreases the cache miss rate, but it increases the cost of searching a block in the cache. Embodiments of the invention can make use of these and other types of caches, or more generally other types of memory resources of the physical machine.

As will be described in greater detail below, the co-residency detection functionality may utilize what is referred to herein as a prime-probe protocol in order to detect activity in one or more randomly-selected cache sets. Consider a cache-based timing channel constructed by measuring the cache load of a monitored entity V that shares a common cache with a monitoring entity U. The prime-probe protocol in this context may include, for example, a prime phase in which entity U fills an entire cache set S by reading a memory region from its own memory space; an idle or wait phase in which entity U waits a prespecified prime-probe interval while the cache is utilized by monitored entity V; and a probe phase in which entity U times the reading of the same memory region to learn activity of V on cache set S. If there is substantial cache activity from V during the prime-probe interval, then U's data is likely to be evicted from the cache set and replaced with data accessed by V. This will result in a noticeably higher timing measurement in the probe phase than if there had been little activity from V. A prime-probe protocol of this type can therefore be used to detect activity by a foe virtual machine in one or more randomly-selected cache sets that are avoided by one or more friend virtual machines.

In the present embodiment, it is assumed that there is a specified mapping between virtual memory and machine memory, as illustrated at the right side of FIG. 2. In this example, the mapping is more particularly assumed to be a double indirection mapping that includes a mapping from a virtual address space to a pseudo-physical address space maintained by the guest operating system 200, and a mapping from the pseudo-physical address space to the machine address space maintained by the hypervisor 112.

Accordingly, in order to coordinate avoidance of the randomly-selected cache set S, an address remapper module in the guest operating system 200 traverses all of the memory pages that the virtual machine 110-1 has been allocated, and finds those that map to the cache set S. The address remapper module will then issue a hypercall to the hypervisor 112 to change the mapping such that the memory pages that previously mapped to the cache set S will instead map to other portions of the cache 204 outside of the cache set S. Such a remapping is illustrated by the dashed line between the pseudo-physical address space and the machine address space in the figure. It should be noted that the virtual to pseudo-physical mapping remains unchanged as a result of this remapping process. Moreover, double indirection mapping is not a requirement of the invention, and other types of mapping, including direct virtual to machine mapping, may be used in other embodiments.

Figure 3:
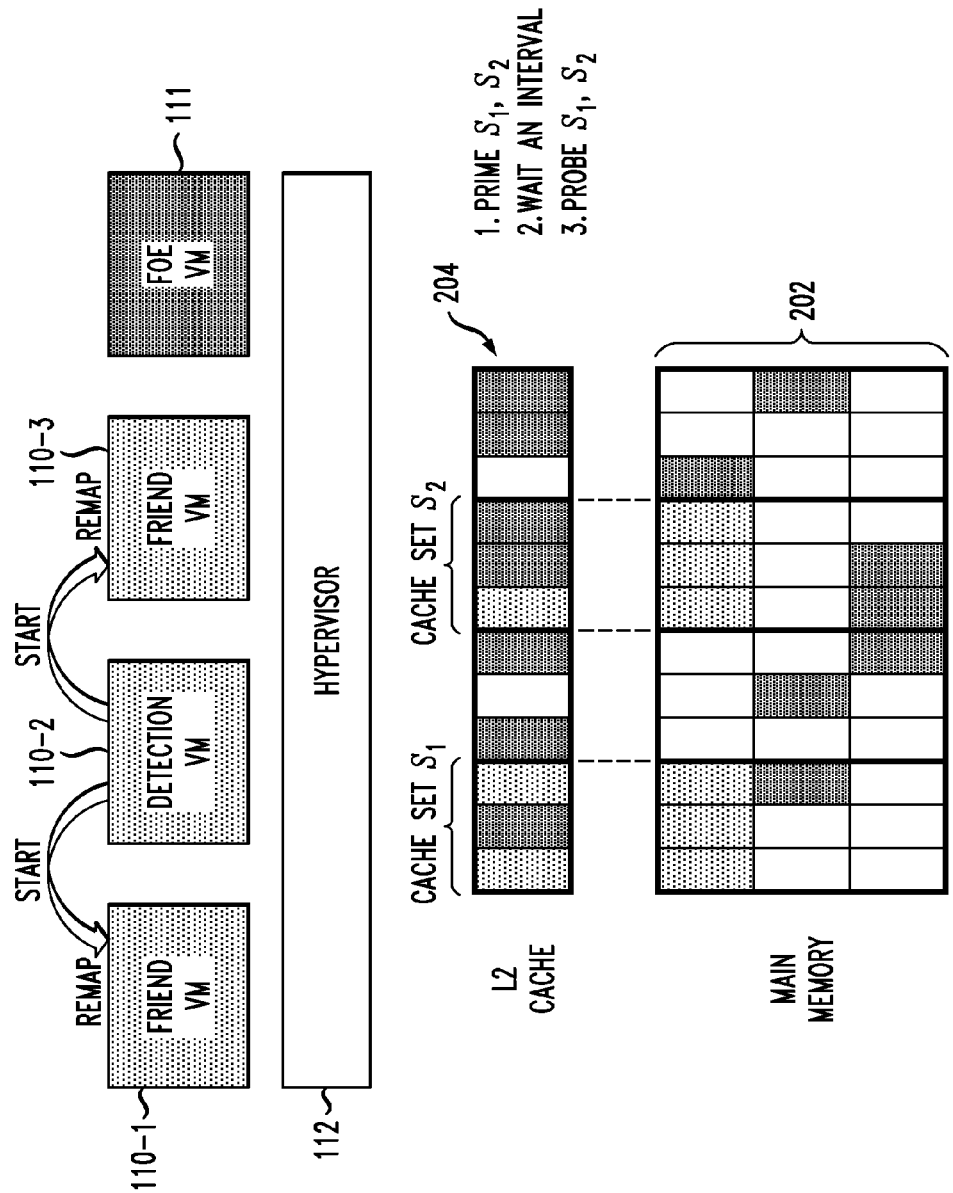
FIG. 3 illustrates a co-residency detection process implemented in the FIG. 1 system that may utilize the FIG. 2 address remapping process.

FIG. 3 shows the co-residency detection process that utilizes the address remapping described above. This figure generally illustrates a single iteration or "trial" of the co-residency detection process, and multiple trials may be conducted before a determination is made as to whether or not a foe virtual machine 111 is actually sharing a physical machine with one or more of the friend virtual machines 110.

One of the friend virtual machines 110 is denoted as an initiator for a given detection period. During the detection period, the initiator runs n trials of the co-residency detection process. For each of the trials conducted during the detection period, the initiator virtual machine randomly selects one of the friend virtual machines to serve as a detection virtual machine. The friend virtual machine so designated is identified as detection virtual machine 110-2 in the single trial illustrated in FIG. 3. This detection virtual machine 110-2 collaborates with additional friend virtual machines, illustratively virtual machines 110-1 and 110-3 in the present example, to coordinate avoidance of a selected portion of the L2 cache 204, in this case randomly-selected first and second cache sets $S_1$ and $S_2$.

As mentioned previously, in other embodiments a single friend virtual machine may serve as both initiator and detection virtual machine in implementing a co-residency detection process.

The selected detection virtual machine 110-2 initiates the corresponding trial by sending a start message to each of the other friend virtual machines. The start message may include the list of randomly selected cache sets to be avoided during the current detection period, in this case cache sets $S_1$ and $S_2$. All of the friend virtual machines, including the detection virtual machine, perform address remapping for the cache sets in the list. The friend virtual machines other than the detection virtual machine send confirmation back to the detection virtual machine. After receiving confirmation from all other friend virtual machines that remapping has been completed, the detection virtual machine starts a prime-probe protocol, which as indicated previously generally includes three phases, namely, a prime phase, an idle or wait phase, and a probe phase.

In the prime phase, the detection virtual machine 110-2 primes the selected cache sets $S_1$ and $S_2$ by moving data from the main memory 202 into those sets. In the wait phase, it waits for a designated time interval. During this wait time interval, any further usage of the selected cache sets $S_1$ and $S_2$ is suspended by the friend virtual machines 110. This time interval may be, for example, on the order of 30 ms, but will of course vary depending upon the implementation details of a given application. In the probe phase, the detection virtual machine probes the selected cache sets $S_1$ and $S_2$ to determine the manner in which data contents of those sets have been altered during that interval. A corresponding probe result is generated which may involve, by way of example, averaging cache access timing measurements over the selected cache sets.

After the n trials of the co-residency detection process are completed for the current detection period, the initiator virtual machine collects the probe results of the respective trials, and processes these probe results to generate a classification result for the detection period which specifies whether or not the level of detected activity in the selected cache sets is indicative of the presence of a foe virtual machine.

Figure 4:
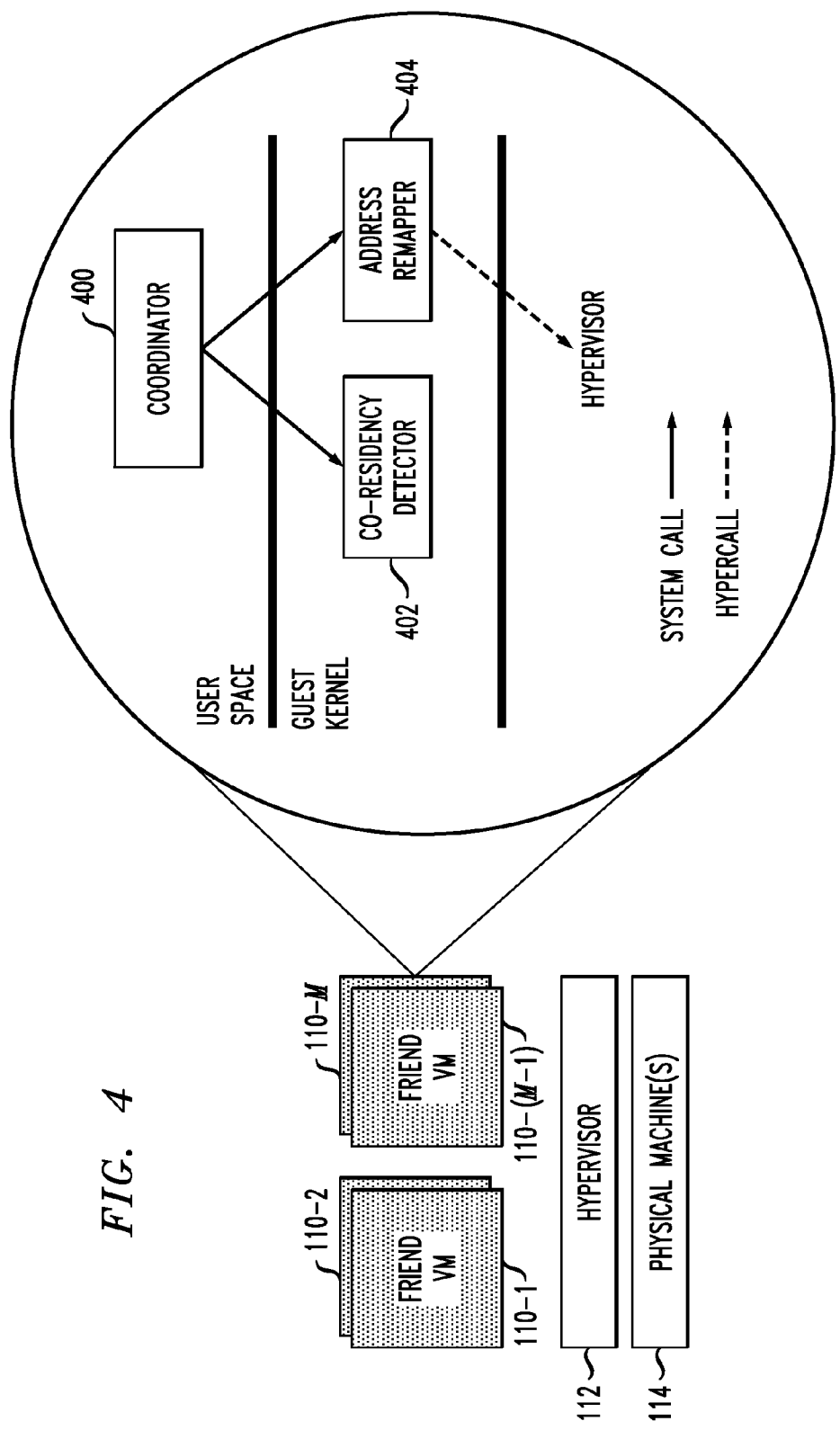
FIG. 4 shows a more detailed view of a portion of the FIG. 1 system including one possible implementation of a set of modules used to perform the address remapping and co-residency detection processes of FIGS. 2 and 3.

FIG. 4 shows a set of modules implemented within each of the friend virtual machines 110 to support the functionality described in conjunction with FIGS. 2 and 3. More particularly, a given one of the friend virtual machines comprises a coordinator 400, a co-residency detector 402 and an address remapper 404. The coordinator 400 is implemented in a user space of the friend virtual machine, and the co-residency detector 402 and the address remapper 404 are implemented in a guest kernel which corresponds to the guest operating system 200 of FIG. 2. As noted above, the address remapper 404 makes a hypercall to the hypervisor 112 to change the mapping such that memory pages that previously mapped to randomly-selected cache sets of L2 cache 204 will instead map to other portions of the cache 204 outside of those cache sets. Such a hypercall is illustrated by the dashed line between the guest kernel and the hypervisor in the FIG. 4 diagram. The coordinator 400 allows the given friend virtual machine to communicate with the other friend virtual machines. It is also configured to start a detection period, and to randomly select one or more cache sets to be collectively avoided by the friend virtual machines during that detection period.

The operation of the various modules 400, 402 and 404 of the FIG. 4 embodiment will now be described in greater detail. Each friend virtual machine coordinator 400 works in user space and is responsible for coordinating the detection task with coordinators in other friend virtual machines residing on the same physical machine. It is assumed that coordinators can determine the friend virtual machines residing on the same physical machine, for example, because this has been configured by the cloud tenant deploying these virtual machines or by otherwise detecting the friend virtual machines.

A detection period is begun by one coordinator 400, referred to as the initiator for the detection period, sending commands (e.g., using TCP/IP) to the other friend virtual machine coordinators. This command indicates a randomly selected "color" that defines the cache sets in each cache on the physical machine that will be used during this detection period for executing prime-probe trials. A coordinator that receives this message invokes its local address remapper (e.g., via a system call) to avoid usage of those cache sets to the extent possible, so that this virtual machine will minimize its activity in those cache sets during the detection period. We note that each coordinator makes no effort to determine whether it is presently on the same cache as the initiator (if the physical machine has multiple caches), either during initiation or at any point during the detection period. Rather, each coordinator uses its associated address remapper to vacate the cache sets of the color indicated by the initiator, for any cache used by its virtual machine for the duration of the detection period. Upon receiving confirmation from its address remapper that those cache sets have been vacated, the local coordinator sends a confirmation to the initiator.

Once the initiator has received confirmation from the friend virtual machines on the physical machine, it creates a token, selects a friend virtual machine on the physical machine uniformly at random, and passes the token to the selected friend virtual machine. The selected friend virtual machine now becomes the token holder and will act as the detector virtual machine for one prime-probe trial. More specifically, the token holder alerts the other coordinators of its impending trial and then contacts its local co-residency detector to perform the prime-probe trial. Once the co-residency detector has completed the trial and returned the trial result r, the token holder collects an activity profile F from the friend virtual machines. Each entry of this activity profile characterizes the I/O activity (e.g., bytes passed through sys_read or sys_write) of the friend virtual machine from which the entry was received, since that virtual machine received the alert preceding the prime-probe trial. Finally, the token holder induces a random delay (to improve independence of trials, as discussed below) and then selects the next token holder uniformly at random (again, for independence) from the friend virtual machines on the physical machine. When passing the token to the new token holder, the sender includes all trial results r and corresponding activity profiles F collected in this detection period so far.

After n trials have been performed, the new token holder can evaluate the results and activity profiles to determine whether or not a foe virtual machine is present on the physical machine, using classification techniques to be described in greater detail below.

The address remapper 404 is provided a "color," which as indicated above defines cache sets that are to be avoided due to their planned use in the pending detection period. To avoid the use of these cache sets, the address remapper colors each physical memory page by the possibly unique color of the cache sets to which its contents are mapped, and then causes its virtual machine to avoid using the cache sets of the designated color by causing it to avoid accessing physical memory pages of the same color.

One way of causing its virtual machine to avoid these memory pages would be to alter the view of memory that the guest OS perceives. For instance, we can "unplug" the memory pages that need to be avoided, by indicating that such pages are unusable in the page descriptor structure in the guest OS. A drawback of this approach is that it breaks up physical memory as perceived by the OS, so that the OS no longer has access to a large, contiguous memory space. For example, the buddy memory allocator used in Linux maintains an array of lists, the j-th entry of which collects a list of free memory blocks of size $2^j$ pages, where j=0, 1, . . . , 10. Therefore, "unplugging" memory pages of one color will result in empty lists for j≥6 in the case of 64 page colors, since a block of $2^6$=64 pages (or larger) will contain one page of each color.

An alternative approach that does not suffer from this drawback is to take advantage of the additional indirection layer in the mapping from virtual to physical memory as illustrated in FIG. 2. The hypervisor in this case provides a pseudo-physical address space to each guest virtual machine and maintains the mapping from pseudo-physical to physical memory. Because physical memory is typically allocated at page granularity in this hypervisor, the memory allocated to each virtual machine is not guaranteed to be actually contiguous, but the contiguous pseudo-physical address space in each guest virtual machine provides the illusion to the guest OS that it is running on an intact physical memory.

In paravirtualized virtual machines, where the pseudo-physical address space is the one that is used across the operating system, the guest OS is also aware of the corresponding machine address of each page, which is embedded in the page table entry for the hardware memory management unit to look up during translation (i.e., translation is done directly from guest virtual address to real machine address). This provides an opportunity to modify the pseudo-physical-to-machine-address mapping to avoid touching certain physical pages while keeping the guest OS view of memory layout unchanged. In particular, to remap the machine address of a single pseudo-physical page, the address remapper issues a hypercall to the hypervisor indicating the new machine address and then modifies the guest OS copy of this mapping. In order to prevent accesses to these mappings while they are being reconfigured, the address remapper disables interrupts and preemption of its virtual core and suspends the other virtual cores, if any, of its guest OS prior to performing the remapping.

In the process of address remapping to avoid using physical pages of the specified color, the address remapper 404 copies page contents out of pages that need to be avoided and then updates page tables accordingly. To provide a destination for these copies, a pool of memory pages may be reserved when the guest OS is booted. This pool should be large enough to hold an entire color of memory. During the remapping process, the address remapper copies each physical page of the specified color to a page in the reserved memory pool of a different color, and then updates the page tables accordingly by issuing hypercalls to the hypervisor. If a page of the specified color corresponds to a page table or page directory that is write protected by the hypervisor, then this page cannot be exchanged and should be left alone.

To summarize, the address remapper 404 in the FIG. 4 embodiment performs the following steps. It enumerates the pseudo-physical pages that are visible from the guest OS. For each page P, the machine address of the page is determined to figure out whether it is the designated color. If so, in which case this page would ideally be remapped, the remapper examines the page table entries pointing to P and also the page descriptor structure. In several cases, e.g., if P is reserved by the co-residency detection process, write-protected by the hypervisor, or a kernel stack page currently in use, then the remapper leaves the page alone. Otherwise, the remapper identifies a new page (of a different color) from its pool and exchanges the machine address of P with that of this new page (via a hypercall). Prior to doing so, it copies P's content to this new page if P was in use. The remapper updates the kernel page table (also by hypercall) and, if P was used in user space, then the remapper updates the user-space page tables.

This implementation constrains the number of colors that can be used and thus the granularity at which we can select cache sets to avoid. Let w denote the way-associativity of the cache; m be the number of cache sets; c be the size of the cache in bytes; l be the size of a cache line in bytes; p be the size of a page in bytes; and k denote the maximum number of page colors. Each l-sized block of a page can be stored in a distinct cache set, and avoiding a particular cache set implies avoiding every page that includes a block that it could be asked to cache. Since the p/l blocks of the page with index i map to cache set indices {i(p/l)mod m, . . . , (i+1)(p/l)−1 mod m}, the most granular way of coloring cache sets in this embodiment is to have one color correspond to cache sets with indices in {i(p/l)mod m, . . . , (+1)(p/l)−1 mod m} for a given $$i \in \left\{0, \ldots, \frac{m}{p/l} - 1\right\}.$$

Since m=c/(w×l), the number k of colors that such an implementation can support is:

$$k = \frac{c/(w \times l)}{p/l} = \frac{c}{w \times p}.$$

For example, on a processing platform comprising an Intel Core 2 Quad processor, the L2 cache may be characterized by c=6 MB, w=24, and l=64B, with Linux page size being given by p=4 KB Thus the number of page colors in this example is k=64.

The co-residency detector 402, which may be implemented as a Linux kernel extension, executes the prime-probe protocol for measuring L2 cache activity. To prime the cache sets to be used in the prime-probe trial (i.e., of the color specified by the coordinator 400), the co-residency detector requests data from pages that map to those cache sets. To do so, at initialization the co-residency detector allocates physical pages sufficient to ensure that it can prime any cache set.

When invoked by the coordinator 400, the co-residency detector 402 primes the cache sets of the specified color, and then waits for the prime-probe interval. This interval may be configured empirically to be long enough for a reasonably active foe virtual machine to divulge its presence in the cache but not so long that core migration of the detection virtual machine becomes likely. For example, a prime-probe interval of about 30 ms may be used in the present embodiment.

The co-residency detector 402 may be tuned to improve its detection ability in several ways. For example, in a given embodiment, every cache miss may cause one line to be filled with the requested content and another to be filled through prefetching, such that a cache miss fills two cache lines in consecutive cache sets. As such, the co-residency detector may be configured to probe only every other cache set. In addition, to eliminate noise due to the translation lookaside buffer (TLB), the co-residency detector may flush the TLB before its probe of each cache set, so as to ensure a TLB miss. As another example, the co-residency detector may disable interrupts and preemption during the prime-probe protocol to limit activity that might disrupt its detection.

An advantage of the disclosed techniques of the present embodiment is that the coordination and monitoring may be implemented entirely by the friend virtual machines operating collaboratively, and therefore without requiring any separate modification or other control of the associated hypervisor. These techniques also provide a given tenant of a cloud service provider with the ability to determine whether or not its virtual machines share a physical machine with one or more other unrelated virtual machines associated with different tenants of the same cloud service provider.

It was noted above that the co-residency detection functionality disclosed herein therefore does not require the use of two or more friend virtual machines. Instead, a co-residency detection process can be run by a single virtual machine that, for example, selects a random cache region to be avoided, primes the cache, avoids the selected cache region during a fixed time interval and finally probes the cache and measures the probing time. The process is much simpler in that case, because no coordination among multiple friend virtual machines is required.

The portion of the cache selected for avoidance may be a single cache set or multiple cache sets. As the avoided cache region grows, co-residency detection accuracy increases, but at the expense of additional performance overhead for the one or more friend virtual machines during the detection period. In one implementation, a number of cache sets corresponding to approximately $1/16^{th}$ of the cache memory was used as the randomly selected portion to be avoided. Other portions of a memory resource of a physical machine may be selected for avoidance in alternative embodiments.

Embodiments of the invention may utilize a single-probe classifier or a multiple-probe classifier. A single-probe classifier may be implemented by averaging the probe timings observed in a single trial (i.e., averaging over the cache sets utilized) and comparing this average to a threshold. If the average probe timing is less than the threshold, then this implies low baseline activity in the system, and thus results in a foe-absent classification. Otherwise, the probe timing implies high activity, and the classification returned is foe-present. However, use of a single-probe classifier may provide insufficient detection accuracy in a given embodiment. Improved accuracy is provided using a multiple-probe classifier that works for n trials where n>1. For simplicity, we first describe this multiple-probe classifier assuming that friend virtual machine activities (e.g., primarily I/O activity), as well as the number of friend virtual machines, are constant and known a priori, and then we relax these assumptions to present a more general classifier.

Assuming a constant and known number of friend virtual machines and level of friend virtual machine activity, a prime-probe trial yields a result, which may be, for example, the probe time, averaged over all cache sets probed. The result of the timing measurement should be largely independent of friend virtual machine memory activity, since friend virtual machines will have been instructed to avoid the parts of their caches on which the detection virtual machine conducts its prime-probe trials.

The trial results may exhibit a bimodal distribution, which is roughly a mixture of two normal distributions. The first normal distribution characterizes the low level of activity that the detection virtual machine registers when running on a different cache than the hypervisor or any associated control management virtual machine during the prime-probe trial. The second normal distribution characterizes the moderate level of activity observed when the detection virtual machine shares a cache with the hypervisor or any associated control management virtual machine. Accordingly, we define two overlapping classes for trial results. The first includes the majority of readings from the first normal distribution, and the second includes the large majority of readings from both normal distributions. This design is motivated by the observation that the presence of a foe virtual machine will tend to decrease the number of readings that fall into either class, as will be described below.

To determine if a given prime-probe trial result r belongs to one of these two classes, we empirically determine two thresholds $t_c$ and $t_d$, where $t_c < t_d$, such that the cache timing measurements from the first class fall into $[0, t_c]$ and those from the second class are in the range $[0, t_d]$. We next experimentally measure the empirical probability with which r actually falls into each of the two classes over many prime-probe trials for the friend virtual machine workload, which is assumed constant for the present discussion. Assuming independent trials for now, we let $\pi_c$ denote the empirical probability with which r falls into the first class and $\pi_d$ be the empirical probability with which it falls into the second class. Given n independent trials, we expect r to land in the first class $\bar{c} = \pi_c n$ times, and in the second class $\bar{d} = \pi_d n$ times. Let us then consider an actual execution of the co-residency detection process: A sequence of n monitoring trials that aim to determine whether a foe is present. Let c denote the number of times that r actually belongs to the first class, and d denote the number of times it belongs to the second class. In any of several ways, the presence of a foe virtual machine might cause c to deviate from its expected value $\bar{c}$ (and d from $\bar{d}$). The foe virtual machine could induce what would be a rare event under a friend virtual machine workload, namely a measurement r that lands above t and so outside of the second class. Alternatively, even if the foe virtual machine induces only moderate cache activity, the presence of the foe could perturb the scheduling of virtual machines so as to decrease the odds that the detection virtual machine observes a quiet cache, either by pushing the detection virtual machine onto the same cache as the hypervisor or its control management virtual machine, or by registering cache activity itself, causing lower c than expected.

One possible detection strategy then is to presume the presence of a foe virtual machine if either c or d is substantially lower than expected. More precisely, we treat a sequence of n prime-probe trials as independent events. We choose a as a desired upper bound on the rate of false detection of a foe virtual machine. In each trial, we can view the hit/miss of the first class (i.e., $r \in [0, t_c]$ or $r \in [0, t_c]$) as a Bernoulli trial with $\Pr[r \in [0, t_c]] = \pi_c$. It is then straightforward to compute the maximum threshold $T_c < \bar{c}$ such that $\Pr[c < T_c] \leq \alpha/2$ when no foe virtual machine is present. We can similarly compute $T_d < \bar{d}$ such that $\Pr[d < T_d] \leq \alpha/2$. To summarize this exemplary strategy, we suspect the presence of a foe virtual machine if in n prime-probe trials, either $c < T_c$ or $d < T_d$. The probability of false detection of a foe virtual machine over this combined test is at most ~$\alpha$.

The preceding description assumed that during the n prime-probe trials, the number of friend virtual machines and the activity levels of those friend virtual machines were constant. In practice, this will generally not be the case, since for realistic values of n (e.g., n≈25) and for realistic times to conduct n trials (in particular, with delays between them, as will be discussed below), the total time that will elapse during the n trials would be more than long enough to witness potentially large swings in load due to fluctuations in inbound requests, for example.

As such, in practice one may compute the thresholds $t_c$ and $t_d$ on a per trial basis as a function of the set F of activity profiles of the friend virtual machines during that trial. That is, F includes a profile for each of the friend virtual machine activities during the prime-probe trial. Each friend virtual machine's entry could include its level of I/O activity and amount of computation, for example. The detection virtual machine collects this information F after each prime-probe trial. It uses this information to select $t_c^F$ and $t_d^F$, and then evaluates whether the trial result r satisfies $r \in [0, t_c^F]$ (in which case it increments c) and whether it satisfies $r \in [0, t_d^F]$ (in which case it increments d).

Besides adjusting $t_c^F$ and $t_d^F$ as a function of F, one may also adjust $\pi_c$ and $\pi_d$ as a function of F. So, henceforth we denote them $\pi_c^F$ and $\pi_d^F$. Specifically, we take $\pi_c^F$ to be the fraction of training trials (described below) with friend virtual machine activity as described by F in which $r \in [0, t_c^F]$, and $\pi_d^F$ to be the fraction of training trials with friend virtual machine activity as described by F in which $r \in [0, t_d^F]$.

For n detection trials, we denote the profile characterizing the activity of the $i^{th}$ trial by $F_i$. Define binary indicator random variables $$\gamma_i = \begin{cases} 1 & \text{if } r_i \in [0, t_c^{F_i}] \\ 0 & \text{otherwise} \end{cases} \text{ and } \delta_i = \begin{cases} 1 & \text{if } r_i \in [0, t_d^{F_i}] \\ 0 & \text{otherwise} \end{cases}$$

where $r_i$ denotes the result of a testing trial with friend virtual machine activity characterized by $F_i$. We treat the observations $\gamma_1 \ldots \gamma_n$ and $\delta_1 \ldots \delta_n$ as Poisson trials. Training data suggest that under the foe-absent hypothesis, $\Pr[\gamma_i=1]=\pi_c^{F_i}$ and $\Pr[\delta_i=1]=\pi_d^{F_i}$. Under this hypothesis, we can then calculate probability distributions for $$c = \sum_{i=1}^{n} \gamma_i$$

and $$d = \sum_{i=1}^{n} \delta_i$$

and maximum thresholds $T_c$ and $T_d$ such that $\Pr[c<T_c] \leq \alpha/2$ and $\Pr[d<T_d] \leq \alpha/2$ for a chosen false detection rate of $\alpha$. As such, by detecting a foe virtual machine if $c<T_c$ or $d<T_d$ we should achieve a false detection rate of at most roughly $\alpha$.

We reiterate that the thresholds $T_c$ and $T_d$ are computed during testing as a function of $F_1, \ldots, F_n$, using values $\pi_c^{F_i}$ and $\pi_d^{F_i}$ obtained from training. The thresholds $t_c^F$ and $t_d^F$ are similarly determined using training, but which ones are used during testing is determined by the profile sets $F_1, \ldots, F_n$ actually observed.

The test outlined above requires trials that are independent, in the sense that the probability of the trial result r satisfying $r \in [0, t_c^F]$ or $r \in [0, t_d^F]$ is a function only of F and foe virtual machine activities (if any), and is otherwise independent of the results of preceding trials. Achieving this independence is not straightforward, however. In practice, an effective scheduler does not migrate virtual cores across physical cores randomly. In fact, if the number of virtual cores is fewer than the number of physical cores, then the hypervisor may not migrate virtual cores at all. This behavior clearly can impact achieving independent trials.

For this reason, one can configure the co-residency detection process to make trials as independent as possible. This can be achieved by assigning the detection virtual machine randomly for each prime-probe trial from among the available friend virtual machines. In addition, one can employ random delays between trials to increase the likelihood that two trials encounter different virtual-to-physical core mappings, provided that friend virtual machines include enough virtual cores to induce changes to these mappings. Such steps increase the independence between trials sufficiently to provide effective foe virtual machine detection.

Training may be used to determine $t_c^F$ and $t_d^F$ as a function of F. One way to accomplish this is to train on the cloud machines themselves, trusting that the interval in which training occurs is absent of any foes. Such a "trust on first use" (TOFU) approach is similar to that used in intrusion detection, key exchange, and many other contexts. A safer approach would be to replicate a machine from the cloud and use it for training, though this may require cooperation from the cloud service provider.

While precisely determining $t_c^F$ may require information as to the cores and thus the caches that the hypervisor utilized during a prime-probe trial, such information would typically not be available if training were done using the TOFU approach described above. To leave room for both possibilities, one may employ a training regimen that does not rely on such information. For example, one can collect prime-probe trial results for fixed F in the assumed or enforced absence of a foe virtual machine and then model these results using a mixture of two normal distributions. Intuitively, one normal distribution should capture readings when the hypervisor or any associated control management virtual machine is absent from the cache observed by the detection virtual machine, and one normal distribution should represent readings when the hypervisor or any associated control management virtual machine is present in the observed cache. Accordingly, one can compute a best fit of the training trial results to a Gaussian mixture model of two normal distributions, and then use these two distributions to generate values for $t_c^F$ and $t_d^F$. For example, we can choose $t_c^F$ to be the mean plus the standard deviation of the first distribution, and we choose $t_d^F$ to be the the mean plus the standard deviation of the second distribution.

As described previously, each element of F describes the relevant activities of a distinct friend virtual machine during the prime-probe trial from which the result will be tested using $t_c^F$ and $t_d^F$. Moreover, F includes a distinct such descriptor for each friend virtual machine. To train the classifier, one can incorporate training executions that match the profiles F likely to be seen in practice. The extensiveness of this data collection depends in large part on the features that are incorporated into the virtual machine activity descriptors in F and on the granularity at which these features need to be captured. The training executions should also range over the possible number of virtual machines on the same physical machine, which we assume the party deploying the virtual machines can determine.

Although the above-described framework permits building a co-residency detector based on a variety of features included in the friend virtual machine profiles, we have determined experimentally that an important feature to capture in illustrative embodiments is the level of I/O activity in each friend virtual machine. As previously discussed, the I/O activity of friend virtual machines is highly correlated with hypervisor-related activity evidenced in the cache. Fortunately, capturing this information at only a coarse granularity is sufficient to build an effective detector. For example, one can compute the aggregate number of bytes of I/O activity involving friend virtual machines during the prime-probe trial (e.g., as measured in sys_read and sys_write calls), with the total friend virtual machine I/O activity during the prime-probe trials being binned into one of 20 bins. Any two profiles F and F' falling into the same bin may be treated as equivalent.

As mentioned above, a factor that impacts the detection accuracy is the fraction of the physical machine cache examined in a given trial of the prime-probe protocol. It would be more accurate to probe the entire cache to detect a foe virtual machine, but it is more desirable to utilize only a portion of the cache, so friend virtual machines can utilize the remainder of the cache and, in particular, can continue execution during prime-probe trials. The above-noted portion of $1/16^{th}$ of the cache was found to provide a good balance between these competing goals in one embodiment.

Also, as indicated previously, the co-residency detection functionality disclosed herein can be implemented at least in part in the form of one or more software programs stored in memory and executed by a processor of a processing device such as a processing device 106 or 115 used to implement virtual machines 110. As noted above, a memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the co-residency detection techniques are applicable to a wide variety of other types of storage systems and processing devices. The particular process steps and detection parameters used to determine the presence of unrelated virtual machines sharing a common physical machine may be varied in alternative embodiments. In addition, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   configuring at least one virtual machine implemented on a physical machine to avoid usage of a selected portion of a memory resource of the physical machine for a period of time;
   monitoring the selected portion of the memory resource for activity during the period of time; and
   if a sufficient level of said activity is detected, generating an indication that the physical machine is also being shared by at least one other virtual machine.

2. The method of claim 1 wherein configuring the at least one virtual machine implemented on the physical machine to avoid usage of the selected portion of the memory resource of the physical machine comprises coordinating avoidance of the selected portion of the memory resource of the physical machine for the period of time by a plurality of virtual machines implemented on the physical machine.

3. The method of claim 2 wherein coordinating avoidance by the plurality of virtual machines further comprises randomly selecting a plurality of sets of a cache memory of the physical machine for a given detection period and coordinating avoidance of the plurality of sets for the detection period.

4. The method of claim 3 wherein coordinating avoidance by the plurality of virtual machines further comprises:
   priming the plurality of sets of the cache memory by moving data from a main memory into the plurality of sets; and
   suspending further usage of the plurality of sets by each of the plurality of virtual machines for a designated waiting interval.

5. The method of claim 4 wherein monitoring the selected portion of the memory resource for activity further comprises probing the plurality of sets after the designated waiting interval of suspended usage to determine a manner in which data contents of the plurality of sets have been altered during that interval.

6. The method of claim 5 wherein the priming, suspending and probing are repeated for each of a plurality of trials within the detection period, using the plurality of sets.

7. The method of claim 6 wherein results of said probing over multiple ones of the trials are processed to determine a classification result for the detection period indicating whether or not a level of detected activity is sufficient to indicate that the physical machine is also being shared by said at least one other virtual machine.

8. The method of claim 5 wherein probing the plurality of sets further comprises averaging cache access timing measurements over the sets.

9. The method of claim 2 wherein the coordinating and monitoring are implemented collectively by the plurality of virtual machines without requiring any separate control of an associated hypervisor.

10. The method of claim 2 wherein the plurality of virtual machines are associated with a given tenant of a cloud service provider and said at least one other virtual machine determined to be sharing the physical machine based on the detected activity is not associated with the given tenant of the cloud service provider but is instead associated with a different tenant of the cloud service provider.

11. The method of claim 1 wherein the memory resource of the physical machine comprises a cache memory.

12. The method of claim 11 wherein the cache memory comprises an L2 cache memory.

13. The method of claim 11 wherein the selected portion of the memory resource of the physical machine comprises one or more sets of the cache memory.

14. The method of claim 1 wherein the selected portion of the memory resource of the physical machine comprises a randomly selected portion of the memory resource.

15. The method of claim 1 wherein the indication is made accessible to a tenant of a cloud service provider for use in verifying exclusive use of the physical machine by the tenant.

16. The method of claim 1 further comprising:
   determining an average probe timing for the period of time;
   if the average is less than a specified threshold, generating a foe-absent indication; and
   if the average is at or above the specified threshold, generating a foe-present indication.

17. The method of claim 1 wherein the indication comprises a classification result.

18. The method of claim 17 wherein the classification result is determined using a plurality of thresholds, and wherein each threshold is associated with a different distribution model.

19. A computer program product comprising a non-transitory processor-readable storage medium having encoded therein executable code of one or more software programs, wherein the one or more software programs when executed by a processing platform comprising the physical machine causes the processing platform to perform the method of claim 1.

20. An apparatus comprising:
a physical machine; and
at least one virtual machine implemented on the physical machine;
wherein the at least one virtual machine is configured:
to avoid usage of a selected portion of a memory resource of the physical machine for a period of time;
to monitor the selected portion of the memory resource for activity during the period of time; and
if a sufficient level of said activity is detected, to generate an indication that the physical machine is also being shared by at least one other virtual machine.

21. The apparatus of claim 20 wherein a plurality of virtual machines implemented on the physical machine are configured to coordinate avoidance of the selected portion of the memory resource of the physical machine for the period of time.

22. The apparatus of claim 21 wherein the plurality of virtual machines are configured to coordinate avoidance of the selected portion of the memory resource of the physical machine for the period of time by coordinating avoidance of randomly selected sets of a cache memory of the physical machine for a given detection period.

23. The apparatus of claim 22 wherein the virtual machine configured to monitor the selected portion of the memory resource for activity is further configured to probe the randomly selected sets after a designated waiting interval of suspended usage to determine a manner in which data contents of the randomly selected sets have been altered during the designated waiting interval.

24. The apparatus of claim 23 wherein probing the randomly selected sets further comprises averaging cache access timing measurements over the randomly selected sets.

* * * * *